United States Patent [19]
Nakada et al.

[11] Patent Number: 5,910,518
[45] Date of Patent: Jun. 8, 1999

[54] OXYGEN PERMEABLE CONTACT LENS HAVING HIGH DURABLE HYDROPHILIC SURFACE AND METHOD FOR PRODUCING THE SAME

[75] Inventors: Kazuhiko Nakada, Nisshin; Naomi Saito, Tokyo; Misako Nishibayashi, Aichi-ken; Atsuyuki Nakamura, Nagoya; Yasuhito Hishida, Gifu-ken, all of Japan

[73] Assignee: Menicon Co., Ltd., Japan

[21] Appl. No.: 08/909,829

[22] Filed: Aug. 12, 1997

Related U.S. Application Data

[60] Continuation of application No. 08/738,578, Oct. 29, 1996, Pat. No. 5,708,050, which is a division of application No. 08/559,161, Nov. 13, 1995, abandoned.

[30] Foreign Application Priority Data

Nov. 17, 1994 [JP] Japan .................................. 6-283169
Sep. 19, 1995 [JP] Japan .................................. 7-239623

[51] Int. Cl.$^6$ ................................ C08J 7/04; G02B 1/04
[52] U.S. Cl. .............................. 523/106; 524/21; 524/24; 525/54.1; 527/201; 264/1.7; 427/2.1; 427/2.24; 427/536
[58] Field of Search ........................... 523/106; 427/2.24, 427/2.1, 536; 524/21, 24; 525/54.1; 527/201; 264/1.7

[56] References Cited

U.S. PATENT DOCUMENTS

| | | | |
|---|---|---|---|
| 4,594,401 | 6/1986 | Takahashi et al. | 526/279 |
| 5,002,582 | 3/1991 | Guire et al. | 427/2.24 |
| 5,148,311 | 9/1992 | Beavers et al. | 359/507 |
| 5,409,731 | 4/1995 | Nakagawa et al. | 427/2.24 |
| 5,527,925 | 6/1996 | Chabrecek et al. | 549/430 |

FOREIGN PATENT DOCUMENTS

| | | | |
|---|---|---|---|
| 2139455 | 2/1972 | Germany | 427/536 |
| 93/00391 | 1/1993 | WIPO | C08J 7/04 |

*Primary Examiner*—Andrew E. C. Merriam
*Attorney, Agent, or Firm*—Parkhurst & Wendel, L.L.P

[57] ABSTRACT

A hydrophilic oxygen permeable contact lens having a front surface which is not to be in contact with the cornea of a human eye when the contact lens is worn on the human eye, wherein at least the front surface of the contact lens is coated with a hydrophilicity rendering material which renders the front surface hydrophilic and which is selected from the group consisting of: (A) hydrophilic silicone oil which is represented by the formula given in the specification and whose viscosity at a temperature of 20° C. is not higher than 5,000 centipoise; (B) polysaccharide or its derivative; and (C) denatured collagen whose average molecular weight is in a range of 400~100,000. Also disclosed is a method of producing the hydrophilic oxygen permeable contact lens.

4 Claims, No Drawings

OXYGEN PERMEABLE CONTACT LENS HAVING HIGH DURABLE HYDROPHILIC SURFACE AND METHOD FOR PRODUCING THE SAME

This is a Continuation of application Ser. No. 08/738,578 filed Oct. 29, 1996, now U.S. Pat. No. 5,708,050, which in turn is a Rule 62 division of Ser. No. 08/559,161 filed Nov. 13, 1995, now abandoned.

BACKGROUND OF INVENTION

1. Field of the Invention

The present invention generally relates to a hydrophilic oxygen permeable contact lens and a method for producing the same. More particularly, the invention is concerned with such a hydrophilic contact lens whose appearance is not deteriorated by a surface treatment for a high degree of hydrophilic property at the lens surface, and which contact lens is capable of maintaining the high hydrophilic property for a long time, even after repeated washing or cleaning of the contact lens by a flow of water. The invention is also concerned with a method for producing such a hydrophilic contact lens.

2. Discussion of the Prior Art

There have conventionally been used non-water swellable or absorbable contact lenses, such as a hard contact lens made of a polymer consisting principally of methyl methacrylate, an oxygen permeable contact lens made of a polymer consisting principally of siloxanyl methacrylate and/or fluoroalkyl methacrylate, for instance, and a non-water swellable or absorbable soft contact lens formed of a silicone rubber made mainly of polydimethylsiloxane, or a butyl rubber made mainly of butyl acrylate. The surface of these non-water absorbable contact lenses is hydrophobic. In particular, the oxygen permeable contact lens which has recently attracted public attention exhibits a high degree of hydrophobic property. For improving oxygen permeability of a contact lens, there is a general tendency that a material for forming the contact lens includes an increased amount of silicon- or fluorine-containing component. In other words, a contact lens which exhibits a higher degree of oxygen permeability contains a comparatively large amount of silicon- or fluorine-containing component. Accordingly, the surface of the thus-formed contact lens having the higher degree of oxygen permeability exhibits a considerable high degree of hydrophobic property.

Generally, the above-described oxygen permeable contact lens is transported or handled while it is immersed in a storing or preserving solution. In this case, bacteria would be generated in the storing solution, or the storing solution would leak in the process of manufacture or transportation of the contact lens. To solve this drawback, it is considered to handle or transport the contact lens without being immersed in the storing solution, in other words, to keep the contact lens in a dry state. However, if the oxygen permeable contact lens is kept in the dry state for a relatively long period before it is worn on a human eye, the lens would tend to be excessively dry due to its low degree of hydrophilicity. Accordingly, the contact lens which has been kept in the dry state as described above tends to blur a vision of a lens wearer when the lens is initially worn on the eye of the wearer, and a tear fluid is readily repelled on the surface of the contact lens, whereby the eyesight of the lens wearer is apt to be unstable.

For solving the above problems, there have been made various attempts to improve the hydrophilicity of the oxygen permeable contact lens. For example, JP-A-4-104220 discloses a technique for coating a surface of a contact lens with a hydrophilic compound. Described more specifically, a water-soluble polymer having an amino group is crosslinked by a suitable crosslinking agent, and is then applied to the lens surface to give a hydrophilic coating on the lens surface. However, the contact lens whose surface is coated with the hydrophilic compound according to the above method is not capable of maintaining the hydrophilic property at a satisfactory value for a long time, and the hydrophilic property of the lens is easily deteriorated when the contact lens is repeatedly washed or cleaned by a flow of water.

As another attempt to improve the hydrophilicity of the oxygen permeable contact lens, it is proposed that the oxygen permeable contact lens be subjected to a plasma surface treatment. However, the contact lens which has been subjected to such a plasma surface treatment would not exhibit a satisfactory hydrophilic property at its lens surface if the contact lens is kept in a dry state for a relatively long period before it is worn by the user. In this case, a layer formed on the lens surface as a result of plasma treatment undesirably enters into the composition of the contact lens. Thus, it has been long desired to develop an oxygen permeable contact lens which assures excellent durability in its hydrophilic property at its lens surface.

It is also proposed to effect plasma polymerization of a hydrophilic monomer for improving the hydrophilicity of the contact lens. According to this proposal, there is formed a plasma-polymerized layer on the surface of the lens, whereby the contact lens exhibits improved hydrophilicity. However, it is generally difficult to control the formation of the plasma-polymerized layer on the lens surface. For instance, the lens surface tends to be plasma-polymerized to an excessive extent for attaining the desired degree of hydrophilicity at the lens surface. As a result, the contact lens is unfavorably colored, or a residual monomer irritates the eye of the lens wearer. Thus, the contact lens produced according to this method is not suitable for use.

SUMMARY OF THE INVENTION

It is therefore a first object of the present invention to provide a hydrophilic oxygen permeable contact lens free from the above-described problems, by coating a lens surface with a suitable coating material without deteriorating the appearance of the contact lens, so that the contact lens exhibits a high degree of hydrophilic property for a long time even after repeated washing or cleaning by a flow of water, and so that the contact lens can be kept or transported in a dry state.

It is a second object of the invention to provide a method of producing such a hydrophilic oxygen permeable contact lens.

The above first object may be attained according to a first aspect of the present invention which provides a hydrophilic oxygen permeable contact lens having a front surface which is not to be in contact with the cornea of a human eye when the contact lens is worn on the human eye, wherein at least the front surface of the contact lens is coated with a hydrophilicity rendering material which renders the front surface hydrophilic and which is selected from the group consisting of: (A) hydrophilic silicone oil which is represented by the following formula (1) and whose viscosity at a temperature of 20° C. is not higher than 5,000 centipoise; (B) polysaccharide or its derivative; and (C) denatured collagen whose average molecular weight is in a range of 400~100,000:

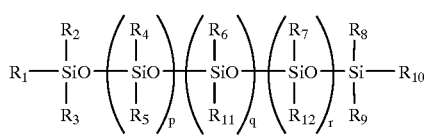

(1)

where, p: 5~200 q: 0~50, r: 0~50, $q+r \geq 1$, $R_1$~$R_{10}$: alkyl group having 1~4 carbon atoms or phenyl group, each of $R_1$ ~$R_{10}$ being in different groups or in the same group,

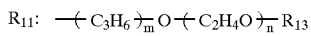

$R_{11}$: $-(C_3H_6)_m-O-(C_2H_4O)_n-R_{13}$ where, m: 0~1, n: 1~20, $R_{13}$: alkyl group having 1~30 carbon atoms or aryl group,

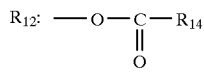

$R_{12}$: $-O-C(=O)-R_{14}$ where, $R_{14}$: alkyl group having 1~20 carbon atoms.

In the hydrophilic oxygen permeable contact lens according to the first aspect of the invention, at least the front surface of the lens is coated by the suitable hydrophilicity rendering material. When the contact lens is worn by the user, the front surface of the contact lens is exposed to an ambient air, and is accordingly dried in the absence of a required aqueous fluid. In view of this, the front surface of the contact lens is coated with the hydrophilicity rendering material for endowing the front surface with enough hydrophilicity, so that the front surface of the contact lens has good wettability.

According to one preferred form of the first aspect of the invention, the polysaccharide or its derivative is gum arabic, cellulose, a derivative of the gum arabic, or a derivative of the cellulose. According to another preferred form of the first aspect of the invention, the denatured collagen is a collagen-type surface active agent.

The above second object may be attained according to a second aspect of the invention which provides a method of producing a hydrophilic oxygen permeable contact lens having a front surface which is not to be in contact with the cornea of a human eye when the contact lens is worn on the human eye, comprising the steps of: preparing an aqueous solution containing 0.05~25% by weight of a hydrophilicity rendering material, the hydrophilicity rendering material rendering the front surface hydrophilic and consisting of hydrophilic silicone oil which is represented by the above-identified formula (1) and whose viscosity at a temperature of 20° C. is not higher than 5,000 centipoise, or polysaccharide or its derivative; coating at least the front surface of the contact lens with the hydrophilicity rendering material, by contacting the contact lens with the aqueous solution containing the hydrophilicity rendering material; and drying the contact lens whose front surface has been coated with the hydrophilicity rendering material.

The above second object may also be attained according to a third aspect of the invention which provides a method of producing a hydrophilic oxygen permeable contact lens having a front surface which is not to be in contact with the cornea of a human eye when the contact lens is worn on the human eye, comprising the steps of: preparing an aqueous solution containing, as a hydrophilicity rendering material, 0.05~25% by weight of denatured collagen whose average molecular weight is in the range of 400~100,000; coating at least the front surface of the contact lens with the denatured collagen, by contacting the contact lens with the aqueous solution containing the denatured collagen as the hydrophilicity rendering material; irradiating the contact lens whose front surface has been coated with the denatured collagen, with ultraviolet rays; and drying the contact lens which has been irradiated with the ultraviolet rays.

According to one preferred form of the above-described second or third aspect of the invention, the aqueous solution containing the hydrophilicity rendering material may further contain alcohol, preferably, ethanol. The alcohol, preferably, ethanol contained in the aqueous solution is effective to reduce a time required for the above-described drying process.

DETAILED DESCRIPTION OF THE PREFERRED EMBODIMENT

The above and optional objects, features and advantages of the present invention will be better understood by reading the following detailed description of the presently preferred embodiment of the invention.

The oxygen permeable contact lens whose front surface is to be coated with the suitable coating material according to the present invention is suitably selected from any known contact lens. For instance, an oxygen permeable contact lens formed of a polymer including components as disclosed in U.S. Pat. No. 4,594,401 (JP-B-62-55122) is suitably employed. More specifically described, the oxygen permeable contact lens disclosed therein is formed of the polymer obtained by copolymerizing a silicon-containing monomer as indicated below with other monomer such as methyl acrylate, methyl methacrylate, alkyl acrylate or alkyl methacrylate. Examples of the silicon-containing monomer include: trimethylsilyl styrene, pentamethyldisiloxanyl styrene, tris[trimethylsiloxy]silyl styrene, trimethylsilyl acrylate, trimethylsilyl methacrylate, pentamethyldisiloxanyl acrylate, pentamethyldisiloxanyl methacrylate, pentamethyldisiloxanylpropyl acrylate, pentamethyldisiloxanylpropyl methacrylate, tris[trimethylsiloxy]silylpropyl acrylate, tris[trimethylsiloxy]silylpropyl methacrylate.

According to the present invention, the oxygen permeable contact lens formed as described above is coated with the hydrophilicity rendering material selected from the group consisting of the hydrophilic silicone oil, the polysaccharide or its derivative, and the denatured collagen. Described in detail, the hydrophilic silicone oil employed in the present invention is represented by the above-identified formula (1), and has a viscosity value which is not higher than 5,000 centipoise at a temperature of 20° C. If the hydrophilic silicone oil has a viscosity value higher than 5,000 centipoise at the temperature of 20° C., it is difficult to handle the hydrophilic silicone oil when preparing the aqueous solution thereof (coating liquid). In addition, the viscosity of the prepared coating liquid would be raised, leading to lowered working efficiency in coating the contact lens with the coating liquid.

The polysaccharide or its derivative may be suitably selected from any known material as long as it is hydrophilic. Examples of the polysaccharide employed in the present invention include: dextran, cellulose, pullulan, starch, gum arabic, sodium alginate. The derivatives of those polysaccharides include: hydroxy alkyl derivatives such as hydroxy propyl cellulose; alkyl derivatives; acetate derivatives; sulfuric ester derivatives; and amino derivatives. In the present invention, it is preferable to employ gum arabic, cellulose, a derivative of the gum arabic or a derivative of the cellulose, since these materials are tasteless and odorless, and the coating liquid to be obtained from each of these materials has a relatively low viscosity value when the concentration of the coating liquid is relatively high, thereby to make it easier to effect the coating treatment on the contact lens.

The denatured collagen employed in the present invention is hydrophilic, and has an average molecular weight in the range of 400~100,000. Examples of such denatured collagen include: water-soluble collagen obtained by extracting insoluble collagen by using suitable acid; atelocollagen obtained by hydrolyzing and removing telopeptide; geratin; hydrolyzed collagen; and a product obtained by decomposition of methylated collagen which is chemically modified. If the average molecular weight of the denatured collagen is smaller than 400, it is difficult to impart a desired degree of hydrophilicity to the contact lens. If the average molecular weight is larger than 100,000, the viscosity of the coating liquid is too high, deteriorating the working efficiency in coating the contact lens with the coating liquid. The term "denatured" used herein generally means that the property or state of a substance is changed due to various factors so that the biological activity of the substance is reduced or lost. More specifically described, collagen is denatured due to physical factors such as heat or pressure, or due to chemical factors, in other words, by chemical substance such as acid, base, acetone, alcohol, or acetamide.

As the denatured collagen, a collagen-type surface active agent is preferably employed in the present invention, for the purpose of assuring better wettability of the contact lens and improving the working efficiency in the coating process. The collagen-type surface active agent may be a derivative of water-soluble collagen or hydrolyzed collagen, such as a derivative obtained by reaction of a side-chain amino group or a side-chain carboxyl group of the water-soluble collagen with carboxylic acid anhydride or alcohol, or a derivative (acylated peptide) obtained by chemically bonding an end amino group of the hydrolyzed collagen to fatty acid chloride, by using alkali.

In the hydrophilic oxygen permeable contact lens according to the first aspect of the present invention, at least the front surface of the contact lens (which is not to be in contact with the cornea of the human eye when the lens is worn on the eye) is coated with the hydrophilicity rendering material as described above, whereby the front surface of the contact lens exhibits an excellent hydrophilic property.

The hydrophilic oxygen permeable contact lens is advantageously produced in the following manner according to the second or third aspect of the invention as stated above.

Initially, an aqueous solution containing the hydrophilicity rendering material is prepared by dissolving or dispersing, in an aqueous medium such as distilled water, soft water or pure water, the hydrophilicity rendering material selected from the group consisting of: the hydrophilic silicone oil, polysaccharide or its derivative, and denatured collagen, such that the aqueous solution has a concentration of 0.05~25% by weight of the hydrophilicity rendering material. In an attempt to reduce the required time for the drying process for drying the contact lens to be effected later, alcohol such as methanol or ethanol may be added to the aqueous solution. Especially when the ethanol is added to the aqueous solution, the contact lens may take advantage of an antibacterial activity of the ethanol. The concentration of the hydrophilicity rendering material in the aqueous solution is held in the range of 0.05~25% by weight, in view of the fact that it would be difficult to coat the lens surface uniformly with the hydrophilicity rendering material if the concentration does not fall within the above range.

The thus prepared aqueous solution containing the hydrophilicity rendering material is applied to the oxygen permeable contact lens prepared as described above, such that at least the front surface of the contact lens is coated with the hydrophilicity rendering material of the present invention. The manner of application of the aqueous solution of the hydrophilicity rendering material may be selected from any known method as long as the contact lens can be uniformly coated with the hydrophilicity rendering material contained in the aqueous solution. For instance, the contact lens may be immersed in the aqueous solution. Alternatively, the aqueous solution may be sprayed or dropped over the contact lens which is rotating.

Subsequently, the oxygen permeable contact lens whose front surface has been coated with a film or layer of the hydrophilicity rendering material is dried for removing unnecessary aqueous component retained on the lens surface. This process of drying the contact lens simplifies the manufacturing process of the contact lens as a whole and ensures uniform coating of the hydrophilicity rendering material over the entire area of the front surface of the contact lens. The contact lens may be dried in various known manners. For example, the contact lens is dried in the ambient air or under a stream of air, or dried by using a suitable desiccant. In particular, it is preferable to dry the contact lens in the ambient air for simplifying the manufacturing process of the contact lens and for enabling the hydrophilicity rendering material to be coated uniformly over the lens surface.

When the denatured collagen is employed as the hydrophilicity rendering material, the contact lens is irradiated with ultraviolet rays, prior to the drying process as indicated above. The denatured collagen is polymerized by irradiation with the ultraviolet rays, whereby the denatured collagen is effectively tightly bonded or secured to the contact lens surface.

It will be apparent from the above description that the hydrophilic oxygen permeable contact lens which exhibits excellent durability is easily obtained according to the present method.

The oxygen permeable contact lens is directly coated with the hydrophilicity rendering material according to the above-described method. However, the contact lens may be subjected to various preliminary treatments conventionally effected such as corona discharge treatment, plasma discharge treatment, or a treatment using a strong acid such as hydrochloric acid or nitric acid, before the contact lens is coated with the hydrophilicity rendering material. The hydrophilic oxygen permeable contact lens is capable of exhibiting further excellent hydrophilic property and durability if such a preliminary treatment is effected in combination with the coating treatment of the lens surface with the hydrophilicity rendering material.

In case where the plasma discharge treatment is effected as the preliminary treatment, the treatment is carried out in a suitable atmosphere such as ambient air, nitrogen, argon, helium or a mixed gas obtained by mixing these gases, under a pressure of 0.1–10 Torr. The plasma discharge treatment effected as described above assures further effective coating of the hydrophilicity rendering material on the contact lens surface and enhanced durability of the hydrophilic property of the lens surface.

To further clarify the principle of the present invention, there will be described some examples of the invention. It is to be understood, however, that the invention is not limited to the details of the illustrated examples, but may be embodied with various other changes, modifications and improvements which may occur to those skilled in the art, without departing from the scope of the invention defined in the appended claims.

EXAMPLE

Initially, distilled water was added to each of various hydrophilicity rendering materials as indicated in the following TABLE, to provide specimens of aqueous solution containing the respective hydrophilicity rendering materials, so that each specimen of the aqueous solution has a concentration (% by weight) of the hydrophilic rendering material as indicated in the TABLE. For the specimen No. 9, 70% ethanol solution was used in place of the distilled water. Subsequently, each specimen of the aqueous solution was subjected to suction filtration by using a membrane filter having a pore size of 0.45 μm, for about 19 hours at a temperature of 35° C. The specimen No. 9 was subjected to suction filtration under pressure of 2 atm.

In the mean time, there were prepared a plurality of silicon-containing oxygen permeable contact lenses, each of which is formed of a polymer produced by copolymerizing tris[trimethylsiloxy]silyl styrene as an oxygen permeable component, with acrylic monomer.

The prepared silicon-containing oxygen permeable contact lenses were immersed in the above-prepared specimens of the aqueous solution containing the respective hydrophilicity rendering materials. Then, the contact lenses were dried in the air so that sample Nos. 1–11 of the hydrophilic oxygen permeable contact lenses were obtained. For the sample No. 10, the contact lens was irradiated with ultraviolet rays for one minute, such that the contact lens was placed 15 cm apart from an ultraviolet germicidal lamp. The sample No. 11 was not coated with the hydrophilicity rendering material.

The hydrophilic silicone oils (A), (B) and (C) used for the sample Nos. 1–5 are respectively represented by the following formulas (A)–(C).

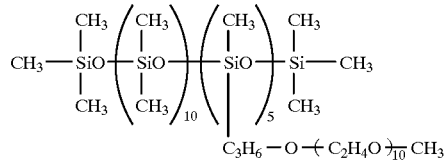

(A)

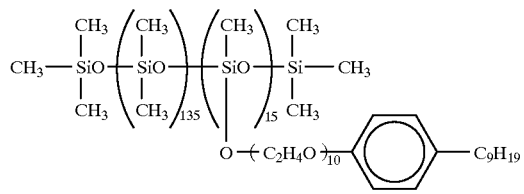

(B)

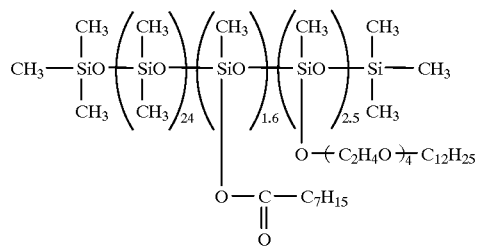

(C)

The viscosity values of these hydrophilic silicone oils (A), (B) and (C) at a temperature of 20° C. were 100 centipoise, 700 centipoise and 40 centipoise, respectively. The average molecular weight of the denatured collagen used for the sample No. 10 was 1,000.

Each sample of the thus obtained hydrophilic oxygen permeable contact lens was checked for the appearance by visual inspection, in terms of transparency of the contact lens and uniformity of coating of the hydrophilicity rendering material on the lens surface. The results of the evaluation are also indicated in the TABLE. The transparency of the contact lens was evaluated as "⊚" (highly transparent), "○" (comparatively transparent) and "x" (not transparent), while the uniformity of coating of the hydrophilicity rendering material was evaluated as "⊚" (highly uniform), "○" (almost uniform) and "x" (not uniform).

Each sample of the obtained hydrophilic oxygen permeable contact lens was rinsed by a flow of water and then, was checked for the wettability of the contact lens surface. The results are also indicated in the TABLE. The wettability was evaluated as "⊚" (excellent), "○" (good) and "x" (poor).

After the evaluation of the wettability, each sample of the oxygen permeable contact lens was dried in the air. Thereafter, an angle of contact with respect to the lens surface of each sample was measured by a droplet or titration method using a measuring device CA-A available from Kyowa Kaimen Kagaku Kabushiki Kaisha, Japan and the results of the measurement are shown in the TABLE.

TABLE

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| hydrophilicity rendering material | A | hydrophilic silicone oil | | | C | polysaccharide (gum arabic*1) | | | derivative of polysaccharide (hydroxy propyl cellulose) | denatured collagen*2 | — |
| | | B | B | B | | | | | | | |
| concentration (% by weight) | 5 | 5 | 1 | 0.5 | 5 | 5 | 1 | 0.5 | 0.5 | 15 | — |
| appearance | | | | | | | | | | | |
| transparency of contact lens | ◉ | ○ | ○ | ○ | ○ | ◉ | ◉ | ◉ | ◉ | ○ | — |
| coating uniformity | ○ | ○ | ○ | ○ | ○ | ○ | ◉ | ◉ | ◉ | ○ | — |
| wettability after rinsing | ○ | ◉ | ○ | ○ | ○ | ○ | ◉ | ◉ | ◉ | ○ | X |
| contact angle (°) measured by droplet method | 90~100 | 20~30 | 20~30 | 50~55 | 30~40 | 40~50 | 90~100 | 100~105 | 10~20 | 40~50 | 110 |

*1: available from SUZU FUNMATSU YAKUHIN KABUSHIKI KAISHA, JAPAN
*2: PROSOFFT KL-30T available from KYOEISHA YUSHI KAGAKU KOGYO KABUSHIKI KAISHA, JAPAN It is generally required that the hydrophilic oxygen permeable contact lens be transparent and that the surface of the contact lens be coated uniformly with the hydrophilicity rendering material. As is apparent from the above TABLE, the hydrophilic oxygen permeable contact lens according to the present invention has a good appearance, in other words, has a high degree of transparency, and the surface of the present contact lens is coated uniformly with the hydrophilicity rendering material. Further, the present contact lens has a good wettability after it is rinsed by a water flow, whereby the contact lens assures an excellent hydrophilic property at the lens surface for a long time. In the present hydrophilic oxygen contact lens, the contact angle of the lens measured after being dried in the air is relatively small. This means that the hydrophilic property of the contact lens is not deteriorated after being rinsed by water and dried in the air, but is effectively maintained for a long period.

In the present hydrophilic oxygen permeable contact lens, at least the front surface of the lens is coated with the particular hydrophilicity rendering material according to the present invention, giving an excellent hydrophilic property to the front surface of the contact lens without deteriorating the appearance of the lens. The hydrophilic property of the front surface of the contact lens can be effectively maintained for a relatively long time after the contact lens is coated with the hydrophilicity rendering material, and in addition, even after the contact lens is repeatedly rinsed, to thereby effectively improve the durability of the hydrophilic property of the contact lens surface. Thus, the present contact lens is capable of exhibiting the hydrophilic property to a sufficient extent, and does not suffer from blurring or glooming and the repelling of the tear fluid on the lens surface conventionally experienced upon initial wearing of the contact lens on the eye of the user, even if the contact lens has been kept in a dry state for a relatively long period before the initial wearing.

Further, the present method for producing the hydrophilic oxygen permeable contact lens makes it possible to easily produce the above-described hydrophilic oxygen permeable contact lens having excellent and uniform quality.

What is claimed is:

1. A hydrophilic oxygen permeable contact lens having a front surface that is not to be in contact with the cornea of a human eye when said contact lens is worn on said human eye, said hydrophilic oxygen permeable contact lens being produced by a method comprising the steps of:

preparing an aqueous solution containing, as a hydrophilicity rendering material, 0.05–25% by weight of a surface active agent whose number average molecular weight is in the range of 400–100,000, said surface active agent being obtained by chemically bonding using alkali an end amino group of a hydrolyzed collagen to fatty acid chloride;

coating at least said front surface of an oxygen permeable contact lens with said surface active agent, by contacting said contact lens with said aqueous solution containing said surface active agent as said hydrophilicity rendering material;

irradiating said contact lens whose front surface has been coated with said surface active agent, with ultraviolet rays; and drying said contact lens which has been irradiated with said ultraviolet rays.

2. The hydrophilic oxygen permeable contact lens of claim 1, wherein said aqueous solution containing said hydrophilicity rendering material further contains alcohol.

3. The hydrophilic oxygen permeable contact lens of claim 2, wherein said alcohol is ethanol.

4. The hydrophilic oxygen permeable contact lens of claim 1, said method further comprising a step of effecting a preliminary treatment selected from the group consisting of: corona discharge treatment; plasma discharge treatment; and a treatment using a strong acid.

* * * * *